Sept. 20, 1960      G. A. MAU      2,953,359
APPARATUS FOR TREATING PULVERULENT MATERIAL
Filed Oct. 16, 1958      3 Sheets-Sheet 1
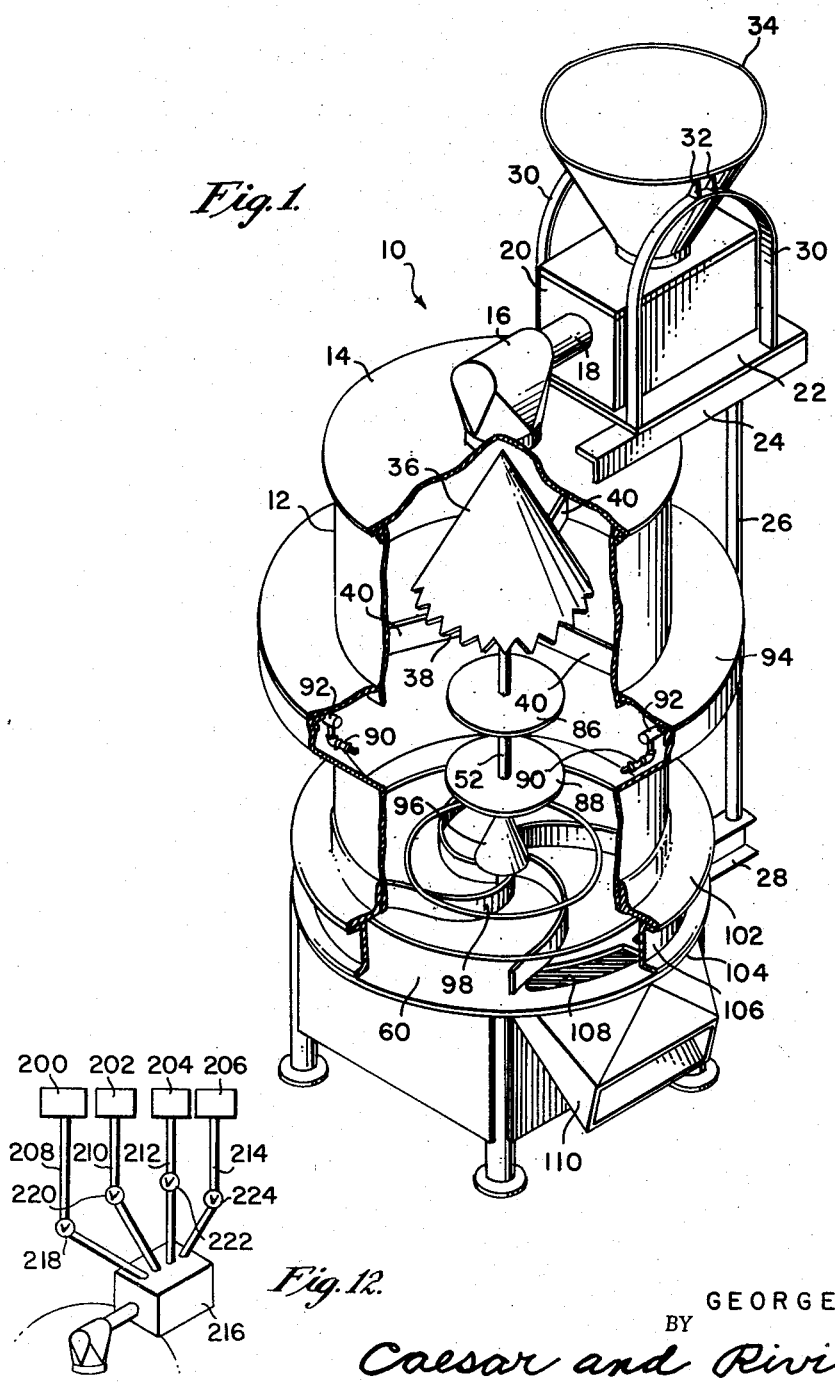
INVENTOR.
GEORGE A. MAU
BY
Caesar and Rivise
ATTORNEYS.

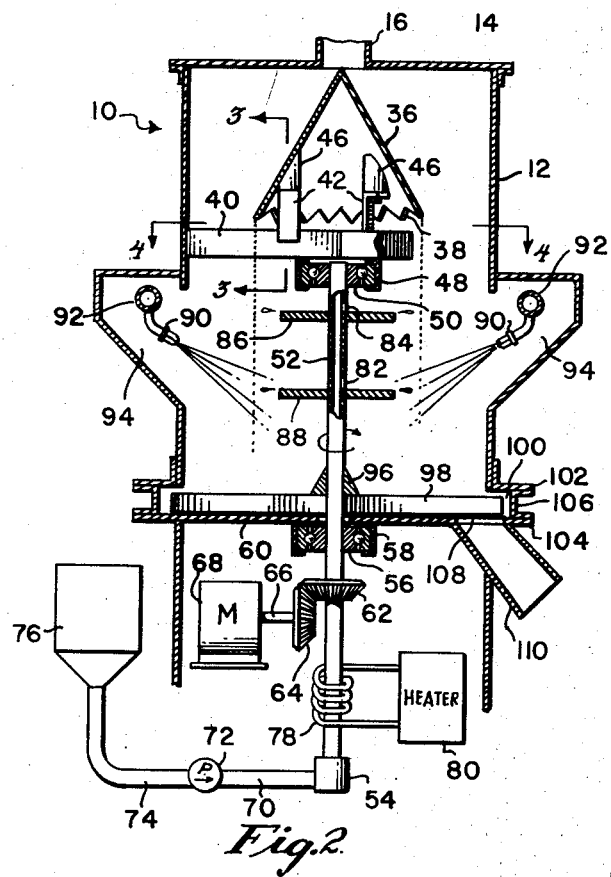
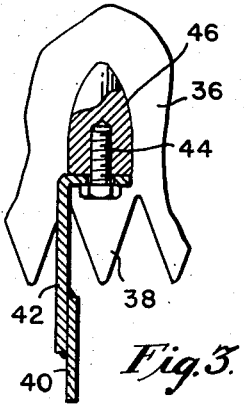
Fig. 3.
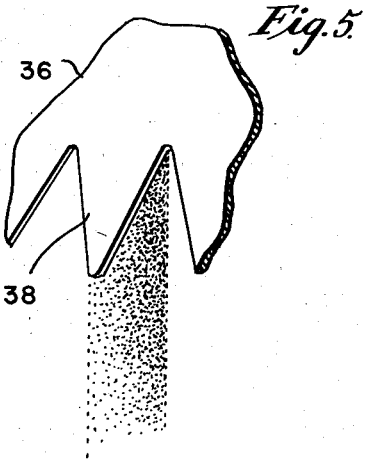
Fig. 5.
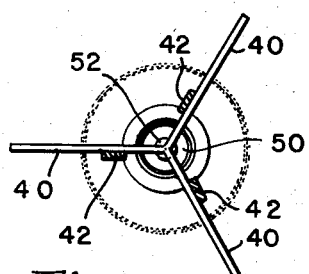
Fig. 4.
INVENTOR.
GEORGE A. MAU
BY
Caesar and Rivise
ATTORNEYS.

Sept. 20, 1960  G. A. MAU  2,953,359
APPARATUS FOR TREATING PULVERULENT MATERIAL
Filed Oct. 16, 1958  3 Sheets-Sheet 3

INVENTOR.
GEORGE A. MAU
BY
Caesar and Rivise
ATTORNEYS.

United States Patent Office 2,953,359
Patented Sept. 20, 1960

2,953,359

APPARATUS FOR TREATING PULVERULENT MATERIAL

George A. Mau, Philadelphia, Pa., assignor to Johnson-March Corporation, Philadelphia, Pa., a corporation of Pennsylvania Filed Oct. 16, 1958, Ser. No. 767,568

18 Claims. (Cl. 259—8)

This invention relates to the treatment of finely divided pulverulent material, and it more particularly relates to a method and apparatus for intimately mixing or blending different types of solid granular materials with each other or with liquids.

The attainment of a truly commercially feasible mixing process for granular material has long been the object of researchers in various fields, particularly in chemical plants, pharmaceutical plants, food processing plants, metallic and non-metallic ore processing plants, ceramic plants, foundries and similar installations. However, it has heretofore never been adequately accomplished. This problem has been particularly troublesome in regard to intermixing of solid and liquid particles and has long been a problem in the dust control field where the thorough wetting of the solid particles is necessary for preventing the formation of dust clouds while the dust is being removed from the collectors and transferred to a removal means.

It is, therefore, one object of the present invention to provide a method and apparatus which will easily and efficiently accomplish a thorough intermixing of fine particles, either solids with solids or solids with liquids.

Another object of the present invention is to provide a method and apparatus for thoroughly wetting finely divided pulverulent material.

Another object of the present invention is to provide a mixing device, of the aforesaid type, which is relatively inexpensive and easy to manufacture.

Other objects and many of the attendant advantages of this invention will be readily appreciated as the same becomes better understood by reference to the following detailed description when considered in connection with the accompanying drawings wherein:

Fig. 1 is a perspective view, partly broken away, of a mixing device embodying the present invention.

Fig. 2 is a sectional, partially diagrammatic, view with some parts removed, of the device shown in Fig. 1.

Fig. 3 is a fragmentary, sectional view taken on line 3—3 of Fig. 2.

Fig. 4 is a sectional view taken on line 4—4 of Fig. 2.

Fig. 5 is a fragmentary, elevational view of a portion of the cone, and illustrating the flow pattern of the pulverulent material therefrom.

Fig. 12 is a somewhat diagrammatic view of an alternative form of feed apparatus.

Figure 6:
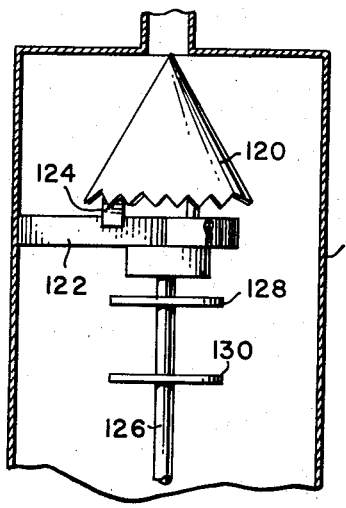
Fig. 6 is a fragmentary view, partly in section and partly in elevation, of an alternative embodiment of the present invention.
Figure 7:
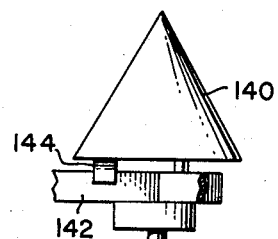
Fig. 7 is an elevational view of an alternative form of the cone.
Figure 8:
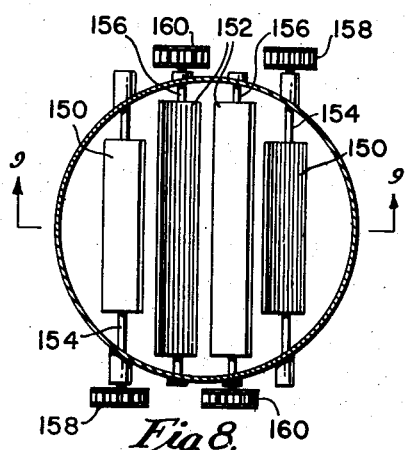
Fig. 8 is a top plan view of an alternative agitating means.
Figure 10:
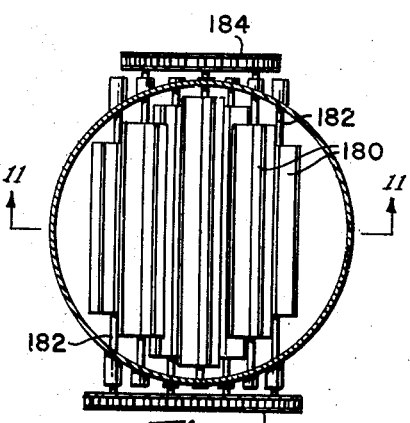
Fig. 10 is a top plan view of a second alternative form of agitating means.
Figure 9:
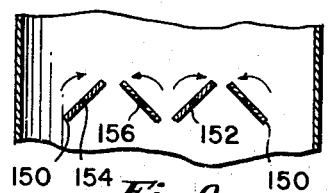
Fig. 9 is a sectional view taken on line 9—9 of Fig. 8.
Figure 11:
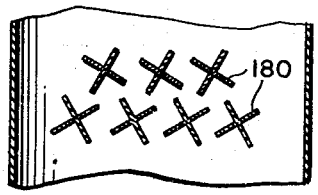
Fig. 11 is a sectional view taken on line 11—11 of Fig. 10.

Although, as indicated above, this invention is generally concerned with the intermixing of particles which may be all solid as well as solid and liquid, the invention will be specifically described with reference to a wetting apparatus for dust; it being understood that this comprises only one embodiment of the present invention and is described for illustrative purposes only.

Referring now in greater detail to the various figures of the drawings wherein similar reference characters refer to similar parts, there is shown a wetting apparatus generally designated 10 which comprises a vertical housing 12 of substantially cylindrical shape.

The upper end of the housing is closed by a preferably removable plate 14 at the central portion of which is provided a feed spout 16. The spout 16 is positioned at the outer end of a horizontal conduit 18 the opposite end of which leads from the interior of a feed hopper 20. The hopper 20 is mounted on a platform 22 supported on oppositely arranged rails 24 (only one being shown) which are, in turn, supported by vertical rails 26 connected at their lower ends to rails 28. The rails 28 extend from the lower portion of the housing 12.

The platform 22 also serves to support a pair of inverted U-shaped brackets 30, each having a pair of wedge-shaped ears 32 at the curved apex thereof to rigidly support a funnel 34 leading into an opening in the upper wall of hopper 20.

Within the housing 12, just under the spout 16, is a hollow cone 36 having its apex within the aperture of the upper plate 14 coincident with spout 16, and having a serrated lower edge including teeth 38. The cone 36 is mounted within the housing 12 by means of three, radially-arranged bars 40 the outer ends of which are connected to the inner surface of the housing and the inner ends of which meet at a focal point underneath the lower end of the cone (as best shown in Fig. 4). Each of these bars 40 is provided with a bracket 42 consisting of a vertical portion and an upper horizontal portion. The horizontal portion is provided with an aperture through which is adapted to extend the stem of a screw 44. The screw 44 extends into the lower end of a boss 46 integral with the inner surface of the cone 36; there being three bosses 46, one for each bracket 42.

Suspended from the bars 40, around their focal point, is an annular channel 48 within which is provided a ball bearing assembly 50. Rotatably positioned within the ball bearing assembly 50 is the upper end of a hollow shaft 52, the lower end of which is rotatably supported in a hollow bearing 54 at the lower end of the housing (see Fig. 2). The intermediate portion of the shaft 52 is rotatably supported by a ball bearing assembly 56 held in an annular channel 58 suspended from the undersurface of a bottom wall or floor 60; this floor 60 having a central aperture through which the shaft 52 extends. The shaft is driven by means of a bevel gear 62 mounted thereon below ball bearing assembly 56; this gear 62 being in mesh with a bevel gear 64 mounted on the motor shaft 66 of an electric motor 68.

Connected to hollow bearing 54 is a fluid conduit 70 which is connected to a pump 72. This pump is only diagrammatically illustrated but may take any desired form and may be either mechanically or electrically driven as well as being either automatic or hand actuated. A conduit 74 connects the pump to a tank 76 in which is stored the wetting agent. This wetting agent, which is generally in the form of a solution, is pumped by means of this system into the bearing 54 and then through the hollow shaft 52. In its course through the lower portion of the shaft, the fluid is heated by means of a heating coil 78 connected to a heater 80. The heater 80 is preferably electrically operated in the ordinary manner. Since this type of heating apparatus is commonly known, it has not been illustrated in any detail here.

By the above means, the fluid wetting agent solution is heated to prevent any freezing of the fluid under cold conditions of use. After being so heated, the solution flows out of openings 82 and 84 in the shaft onto respective discs or plates 86 and 88. These discs 86 and 88 are connected to the shaft 52 and rotate therewith; consequently, the liquid falling thereon is whirled about and projected or propelled into the falling stream of pulverulent material, as will be more fully described hereafter.

At the same time that the wetting agent is propelled outwardly by the discs 86 and 88, additional wetting agent is sprayed or propelled inwardly by means of an annular series of nozzles 90. These nozzles 90 project radially inward from an annular pipe 92. This pipe 92 is positioned within an annular chamber 94 extending radially outward of the cylindrical housing 12. The pipe 92 is mounted in the chamber 94 by ordinary mounting means (not shown) and is supplied with wetting agent solution from a source which is preferably the tank 76 but which may, if desired, be a separate source. The fluid is conducted to the pipe 92 in any desired ordinary manner such as, for example, a pumping system (not shown) similar to that indicated for the flow through shaft 52, a gravity feed or any other desired system.

Also mounted on the shaft 52, by means of a hub 96, is a four-bladed agitating device 98. The blades of the agitator 98 are helical in shape and rotate with the shaft 52 adjacent the upper surface of the wall 60. These blades extend slightly beyond the cylindrical wall of the housing 12 into a peripheral channel 100 which is formed by an outwardly-extending, annular angle-iron 102 at the top and by an annular extension 104 of wall 60 at the bottom. Between these top and bottom members, an annular insert 106 is provided to form the outer wall of the channel 100. Adjacent one portion of the channel 100, a slot 108 is provided in the floor 60, and from this slot there extends a chute 110. If desired, a plurality of annularly spaced slots 108 and of chutes 110 may be provided.

In operation, the pulverulent material to be treated is inserted into the device through funnel 34 from which it flows through hopper 20 into spout 16 and thence onto the apex of cone 36. As the material flows down over cone 36, it is spread out into a constantly thinning annular stream until it eventually drops from the bottom of the cone in the form of a hollow cylinder. As the hollow cylinder of granular material falls, annular streams of wetting solution, thrown out or propelled by the discs 86 and 88, penetrate it from the interior while other streams of wetting solution, sprayed or propelled by nozzles 90, penetrate it from the exterior. The force of both inner and outer streams and the relative thinness of the cylindrical stream of granular material result in a substantial wetting of most of the particles treated; nevertheless, in order to obtain an even greater degree of wetting, the particles, as they fall upon floor 60, are agitated and tumbled by the agitator 98 whereby the particles are not only retained in the wetting area for some additional time but are also, due to the tumbling action, more thoroughly exposed to the wetting fluid. The particles, having been thoroughly wetted, are then swept by the agitator blades through slot 108 and chute 110 into the collecting means for removal.

The teeth 38 provided at the serrated lower edge of the cone 36 serve a definite purpose in the above-described action. As will be readily understood, as the film of granular material flows down the cone 36, the film becomes increasingly thinner due to the constantly increasing cone diameter over which it slides. By providing the additional area formed by the teeth 38, a portion of the stream becomes even thinner (as shown in Fig. 5) while the other portion of the stream falls directly from the recesses between the teeth. This results in a separation of the falling stream into two different components falling from different heights and thereby further thinning out the stream; consequently the stream is more apt to be completely wetted.

The apparatus described above has been illustrated as combining both interior and exterior wetting. However, in many instances, it is not necessary to use both types of wetting action. In such cases, no fluid need be pumped through shaft 52 so that only an exterior spraying is effected. If desired, the hollow shaft 52 and its throwing discs 86 and 88 may be entirely replaced by a solid shaft. In such instance, the shaft could be directly attached to the motor shaft, thereby eliminating the gearing.

On the other hand, if only interior spraying is desired, the device can be formed as in Fig. 6. Here, the cone 120 is similar to cone 36 and is similarly mounted on radial bars 122 by means of brackets 124. The shaft 126 is, similarly, hollow and is provided with throwing discs 128 and 130. All other parts (not specifically illustrated) are similar to those in the first described embodiment of the invention except that, with the elimination of the pipe 92 and nozzles 90, there is no need for the peripheral chamber 94; consequently, this chamber is eliminated and the housing 132 is, therefore, formed completely cylindrical. This saving of space permits the easy placement of the housing 132 within an insulating jacket which is often necessary when the material to be treated is very hot or cold.

Although the serrated cone is preferable, it is also possible to use this device effectively with an unserrated cone. Such a cone is illustrated at 140 in Fig. 7. In other ways, this cone 140 is similar to those heretofore described, being mounted on radially extending bars 142 by means of brackets 144.

The agitating means illustrated in Figs. 1 and 2 comprises a plurality of helical blades rotating in a horizontal plane; however it is also possible to use other means such as illustrated in Figs. 8 and 9. Here, the agitating means comprises a plurality of boards or paddles. These paddles include outer paddles 150 and inner paddles 152. The paddles 150 and 152 are mounted on rotatable shafts respectively designated 154 and 156. Each of these shafts is provided with a separate chain or belt drive indicated at 158 and 160; these chain or belt drives being individually and operatively connected to a driving motor (not shown). The paddles 150 and 152 are so driven that each rotates at a 90 degree offset relationship to the next adjacent paddle so that each paddle follows the next in 90 degree sequence. As the paddles revolve, they will strike the material falling from the cone and tend to throw it back into the mixing or wetting chamber. The paddles, because of their sequential motion, act as a moving grate through which the material must pass before being discharged. Although only one bank of paddles is illustrated, it is possible to arrange them in vertical decks, one below the other, to provide for as many interruptions for mixing or wetting as is necessary to completely condition the material before it is discharged from the treating area.

In Figs. 10 and 11 there is illustrated yet another agitating arrangement wherein, instead of straight paddles such as illustrated in Figs. 8 and 9, there are provided two decks or banks of rotating wheels 180. These wheels 180 are each of the same general construction comprising four radial blades extending from a central hub. The hub of each wheel 180 is mounted on a rotatable shaft 182; all the shafts 182 of each deck being driven in unison by belt or chain drives indicated at 184 and 186 respectively. The wheels 180 in one bank or deck are arranged so that their blades are offset about 45 degrees from those of the wheels in the other deck whereby, during simultaneous rotation, there is a sequential movement of material from the higher to the lower wheels and then to discharge. If desired, as many banks or decks of wheels as deemed necessary may be used although only two are illustrated.

Although the above-described apparatus has been described as used for solid-liquid particle mixtures, it can also be used for intermixing solid granular particles with each other, whereby the spray streams may be streams of solid particles rather than liquid. The fine dispersion of the particles in the cylindrically-formed stream issuing from the cone and their agitation at the bottom of the housing permits a high degree of intermixture in this manner.

A single funnel 34 has heretofore been shown and described; however, in many applications, any number of volumetric feeding means consisting of a plurality of conduits, each leading from a separate source of material directly into the hopper 20 may be substituted for the funnel 34. For example, in Fig. 12 there is shown a plurality of sources generally designated 200, 202, 204 and 206 which are connected by conduits 208, 210, 212 and 214 respectively, to hopper 216 similar to hopper 20. Interposed in each conduit is a valve means generally designated as 218, 220, 222 and 224 respectively. By this construction, various different types of materials, in various controlled proportions, may be fed into the hopper and there preliminarily intermixed. This mixture then drops onto the cone 36 to form a descending stream. During the descent of the stream, the particles therein tend to tumble over each other in the gradually widening and increasingly thinning stream, resulting in greater intermixing of the increasingly dispersed particles. As the particles then drop from the cone in the hollow cylindrical pattern, a further intermixing takes place due to the tumbling of the particles during their free fall. Although this results in a very thorough blending, a final and most complete blending is effected by the previously described agitating means at the bottom of the chamber.

The volumetrically controlled feed of the various ingredients into the hopper 216 permits a small amount of one material to be thoroughly blended into a much larger amount of another material during the dispersion of these materials in the aforesaid manner.

The valves 218—224 may be manually or solenoid operated or operated in any other feasible manner and may constitute metering valves or needle valves to effect the desired controlled volumetric proportioning.

In any event, the flow of the stream over the cone 36 is constant and the cone capacity is determined by the thickness of the material passing thereover.

When this volumetric type of feed means is used, an intermixing action, either of solids with solids or solids with liquids, is obtained without the use of the sprays. However, the spray means may also be used for additional intermixtures.

Obviously many modifications and variations of the present invention are possible in the light of the above teachings. It is, therefore, to be understood that within the scope of the appended claims, the invention may be practiced otherwise than as specifically described.

What is claimed as the invention is:

1. A device for treating pulverulent material which comprises a vertical housing, an inlet at the upper end of said housing, a vertically-arranged cone positioned within said housing below said inlet, the apex of said cone being adjacent said inlet, a movable agitating means in said housing below said cone and vertically spaced therefrom, said agitating means being movable relative to said cone, propelling means in said housing between said cone and said agitating means, said agitating means being in such a position within said housing that the agitating means acts to expose agitated particles to the propelling means, and discharge means below said agitating means.

2. The device of claim 1 wherein said propelling means comprises an inner projecting means arranged to project a stream radially outward from a position substantially coaxial with the cone and a projecting means positioned radially outward of said cone arranged to project a stream radially inward.

3. The device of claim 1 wherein said propelling means comprises an outer projecting means positioned radially outward of said cone and arranged to project a stream radially inward and below said cone.

4. The device of claim 1 wherein said propelling means comprises an inner projecting means arranged to project a stream radially outward from said cone.

5. The device of claim 1 wherein said cone is provided with a serrated lower edge.

6. The device of claim 1 wherein said cone is provided with a straight lower edge.

7. The device of claim 1 wherein said inlet is connected to a hopper having a plurality of volumetrically controlled feed means for selectively feeding controlled proportions of material into said hopper.

8. The device of claim 1 wherein said inlet is connected to a hopper having a funnel connected thereto.

9. The device of claim 1 wherein said agitating means comprises a plurality of radially-extending, helical blades mounted for horizontal rotation on a common axis.

10. The device of claim 1 wherein said agitating means comprises at least one deck of horizontally-spaced paddles, each paddle being individually and sequentially driven relative to the others.

11. The device of claim 1 wherein said agitating means comprises at least one deck of horizontally-spaced wheels, each wheel comprising a hub portion from which radially extend a plurality of blades.

12. A device for treating pulverulent material comprising a generally cylindrical vertical housing, an inlet opening at the upper end of said housing, a vertically-arranged cone in said housing, said cone having its apex at its upper end adjacent said inlet opening and its lower portion being rigidly supported in said housing, a movable agitating means below and spaced from the lower end of said cone, said agitating means being movable relative to said cone and being constructed and arranged to tumble granular material descending from said cone prior to ejecting said material, outlet means below said agitating means for discharging the ejected material from said housing, and spray means positioned in annular arrangement around the area between the cone and the agitating means, said agitating means being in such a position within said housing that the agitating means acts to expose agitated particles to said spray means.

13. The device of claim 12 wherein said spray means comprises a plurality of annularly spaced nozzles connected to an annular pipe positioned within an annular chamber extending radially outwardly of said housing.

14. A device for treating pulverulent material comprising a generally cylindrical vertical housing, an inlet opening at the upper end of said housing, a vertically-arranged cone in said housing, said cone having its apex at its upper end adjacent said inlet opening and its lower portion being rigidly supported in said housing, said cone being positioned in a treating chamber in said housing defined at its lower end by a floor, said floor having at least one aperture adjacent its periphery and having a central aperture therein, a rotatable, hollow shaft extending through said central aperture into said treating chamber, means for rotating said shaft, means connecting said shaft to a source of fluid treating material, at least one outlet opening in said shaft within said treating chamber, a coaxially arranged disc on said shaft adjacent to each outlet opening, and an agitating means in said treating chamber adjacent said floor.

15. The device of claim 14 wherein a heating means is operatively associated with said shaft.

16. The device of claim 14 wherein said agitating means comprises a hub mounted on said shaft with a plurality of helical blades radially extending from said hub, said blades being arranged to move over said apertures in the floor upon rotation of said shaft.

17. The device of claim 14 wherein a plurality of annularly-spaced spray nozzles are positioned in said treating chamber adjacent the periphery thereof.

18. In a device for treating pulverulent material which includes a treating chamber containing an inlet and outlet and a spraying means, a distribution cone having its apex adjacent the inlet and being rigidly supported adjacent its wider end, said cone having a smooth conical surface throughout and being serrated at said wider end.

References Cited in the file of this patent

UNITED STATES PATENTS

| | | |
|---|---|---|
| 563,978 | Meinshausen | July 14, 1896 |
| 655,552 | Gorton | Aug. 7, 1900 |
| 730,564 | Perkins | June 9, 1903 |
| 1,004,908 | Roop | Oct. 3, 1911 |
| 1,177,666 | Wayling | Apr. 4, 1916 |
| 2,071,846 | Lamb et al. | Feb. 23, 1937 |
| 2,460,605 | Soissa | Feb. 1, 1949 |
| 2,746,375 | Abbott et al. | May 22, 1956 |
| 2,805,051 | Miller | Sept. 3, 1957 |
| 2,859,946 | Boyle et al. | Nov. 11, 1958 |
| 2,862,511 | Forsberg | Dec. 2, 1958 |

FOREIGN PATENTS

| | | |
|---|---|---|
| 812,908 | Germany | Sept. 6, 1951 |